United States Patent [19] [11] Patent Number: 5,375,120
Hirano et al. [45] Date of Patent: Dec. 20, 1994

[54] MULTIPLEX TRANSMISSION APPARATUS

[75] Inventors: Seiji Hirano, Hiroshima; Yoshikazu Nobutoki, Higashihiroshima, both of Japan

[73] Assignee: Mazda Motor Corporation, Hiroshima, Japan

[21] Appl. No.: 38,831

[22] Filed: Mar. 29, 1993

[30] Foreign Application Priority Data

Mar. 30, 1992 [JP] Japan .................. 4-073726

[51] Int. Cl.[5] ................................ H04J 3/02
[52] U.S. Cl. .................... 370/85.1; 307/10.1; 340/825.06
[58] Field of Search ............ 370/85.1, 85.2, 85.3, 370/85.6, 85.13, 94.3; 307/10.1, 36, 37, 38; 340/825.06, 825.17, 825.5, 825.51, 825.16

[56] References Cited

U.S. PATENT DOCUMENTS

| 4,578,591 | 3/1986 | Floyd et al. | 307/10.1 |
| 4,584,487 | 4/1986 | Hesse et al. | 307/10.1 |
| 4,739,183 | 4/1988 | Tokura et al. | 307/10.1 |
| 4,942,571 | 7/1990 | Möller et al. | 370/85.1 |
| 5,090,012 | 2/1992 | Kajiyama et al. | 370/85.3 |
| 5,142,474 | 8/1992 | Miyata et al. | 340/825.16 |

FOREIGN PATENT DOCUMENTS 63-148739 6/1988 Japan .

*Primary Examiner*—Alpus H. Hsu
*Attorney, Agent, or Firm*—Staas & Halsey

[57] ABSTRACT

A multiplex transmission apparatus including first-type control nodes connected to a multiplex transmission path, which generate a predetermined signal without operation process to received control information and generated information, and second-type nodes which perform the predetermined operation process to received control information and generated information, and generate a control signal. The first and second type nodes are appropriately used corresponding to control functions.

10 Claims, 3 Drawing Sheets

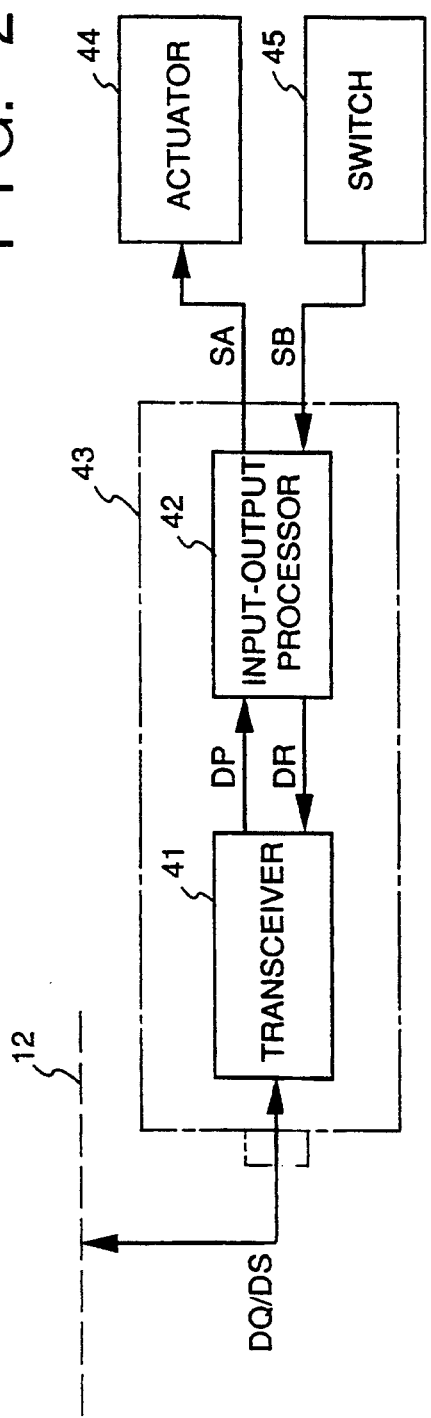
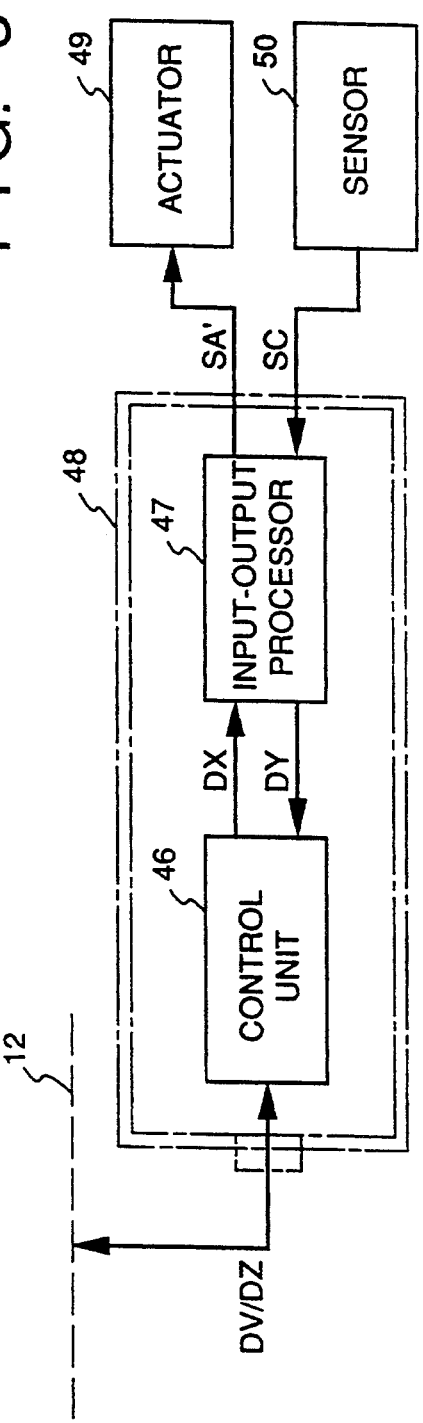

MULTIPLEX TRANSMISSION APPARATUS

BACKGROUND OF THE INVENTION

1. Field of the Invention

The present invention relates to a multiplex transmission apparatus which comprises a plurality of nodes connected to communication lines for transmission and reception of various kinds of control information in a multiplexed fashion, to/from the communication lines.

2. Description of the Related Art

Recent development of electrical components for vehicles and electronic control of such components has brought an enormous increase in wiring, connectors and control devices arranged in a vehicle body, making a wire harness attached to the vehicle body larger in size and heavier in weight. The increased size and weight of the wire harness limits attaching space in the vehicle body, and degraded flexibility of the wire harness lowers attaching efficiency. Furthermore, the increased weight of the wire harness is directly related to increased weight of the vehicle body.

For the purpose of decreasing the number of wires, connectors and control devices, Japanese Patent Application Laid-Open No. 63-148739 proposes a multiplex transmission system for vehicles which comprises a common communication line for multiplex transmission of plural kinds of control information to operate various electrical components, connectors and control devices in vehicles. The common communication line is connected to a plurality of nodes which perform transfer and reception of control information to/from the line, and various electrical components are appropriately connected to the nodes.

In this multiplex transmission system, the communication line for transmission of multiplexed control information comprises a signal transmission path formed with a wire harness arranged in a vehicle body. The plurality of nodes connected to the communication line are respectively combined with actuators including motors arranged at each node and signal generating devices such as sensors and switches. The respective nodes receive selected control information from the communication line and generate a control signal based on the received control information. The nodes supply the control signal to the actuator to perform an operation control, or generate control information based on a signal from the signal generating device and transmit the information to the communication line. The multiplexed control information transmitted through the communication line is expressed by, e.g., a pulse code modulation (PCM) signal in the form of non-return-to-zero (NRZ) modulated carrier wave signal.

In the abovementioned multiplex transmission system, upon forming a control signal based on control information from the communication line, or upon forming control information based on a signal from the signal generating device, the actuator and the signal generating device usually require operation process by an operation control unit comprising, e.g., a microcomputer, in accordance with control information from the communication line or the signal from the signal generating device. The respective nodes include a transceiver connected to the communication line, an operation control unit connected to the transceiver, comprising e.g., a microcomputer and an input-output processor connected to the operation control unit and either of the actuator or the signal generating device.

The actuators and the signal generating devices which require operation process in the nodes are normally arranged in a vehicle body in a decentralized manner. In the conventional multiplex transmission system, an actuator or a signal generating device which requires operation process is included in almost all the nodes. For this reason, the nodes necessarily include both an operation control unit and an input-output processor. However, the system comprising nodes of this type possesses a problem in lowering cost efficiency.

SUMMARY OF THE INVENTION

The present invention has as its object to provide a multiplex transmission apparatus in which a plurality of nodes on multiplex transmission lines are arranged so that the entire structure of the apparatus can be simplified and the cost of the apparatus can be reduced.

According to the present invention, the foregoing object can be attained by providing a multiplex transmission apparatus in which a plurality of control nodes are connected to common multiplex transmission paths in a decentralized manner and the nodes are classified into a plurality of types corresponding to control function. The apparatus comprises communication control means for realizing a communication function based on the types of nodes in the respective plurality of control nodes and operation control means for performing a predetermined operation process in specific control nodes among the plurality of control nodes, wherein the communication control means controls signal communication between the multiplex transmission paths and the operation control means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing a configuration of a low-speed non-operation control type node according to the preferred embodiment;

FIG. 3 is a block diagram showing a configuration of a low-speed operation control type node according to the preferred embodiment;

DETAILED DESCRIPTION OF THE PREFERRED EMBODIMENTS

Preferred embodiments of the present invention will be described in detail in accordance with the accompanying drawings.

Figure 1:
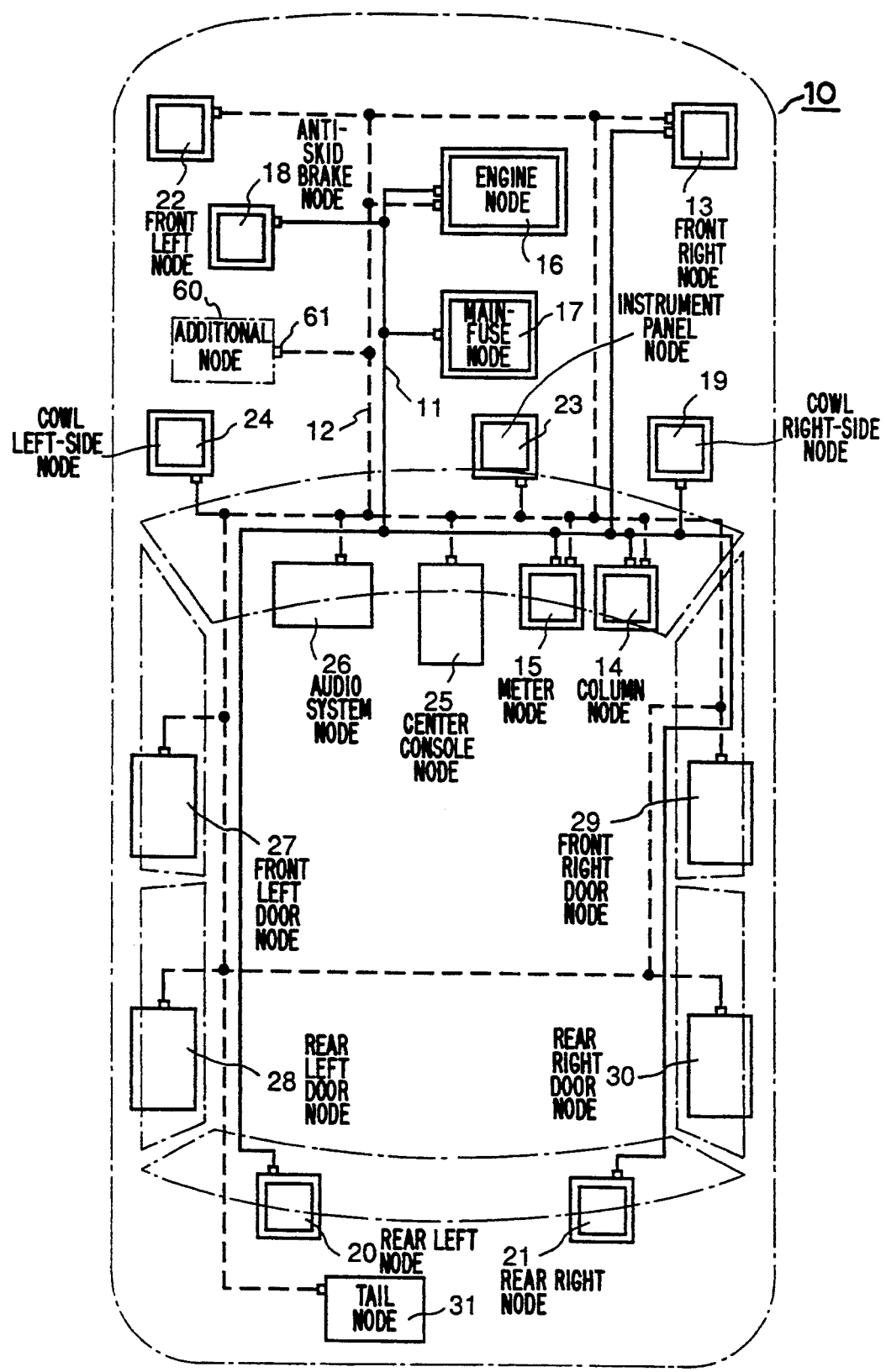
FIG. 1 is a block diagram showing the configuration of a multiplex transmission apparatus according to a preferred embodiment of the present invention.

FIG. 1 shows the configuration of a multiplex transmission apparatus according to a preferred embodiment of the present invention which is applied to a vehicle body.

In FIG. 1, two types of multiplex transmission line systems comprising communication lines expressed by a full line and a broken line are formed in a vehicle body 10 expressed by an alternate long and short dash line. The communication line (the full line) is a high-speed communication line 11 employing a twisted-pair shielded line, and the other communication line (the broken line) is a low-speed communication line 12 employing a twisted-pair line. The high-speed communication line 11 and the low-speed communication line 12 are arranged inside of the vehicle body 10, and a plurality of nodes arranged at respective parts of the vehicle body are connected to the communication lines.

The nodes include a front-right node 13, a column node 14, a meter node 15 and an engine node 16 connected to both the high-speed communication line 11 and the low-speed communication line 12, a main-fuse node 17, an anti-skid brake system (ABS) node 18, a cowl right-side node 19, a rear-left node 20 and a rear-right node 21 connected to the high-speed communication line 11, a front-left node 22, an instrument panel node 23, a cowl left-side node 24, a center-console node 25, an audio-system system node 26, a front-left door node 27, a rear-left door node 28, a front-right door node 29, a rear-right door node 30 and a tail node 31 connected to the low-speed communication line 12.

These plurality of nodes are connected to actuators including motors, and to groups of signal generating devices such as various sensors and switches (not shown in FIG. 1).

Among these plurality of nodes, the nodes connected to the high-speed communication line 11 respectively receive selected control information from the high-speed communication line 11 as received control information, then generate a control signal based on the received control information, and supply the signal to an actuator for control of the actuator. Otherwise, the nodes connected to the high-speed communication line 11, generate control information based on a signal from a signal generating device and send the information as transmission control information to the high-speed communication line 11.

Similarly, the nodes connected to the low-speed communication line 12 among the plurality of the nodes respectively receive selected control information from the low-speed communication line 12 as received control information, then generate a control signal based on the received control information, and supply the signals to an actuator for control of the actuator. Otherwise, the nodes connected to the low-speed communication line 12; generate control information based on a signal from a signal generating device and send the control information as transmission control information to the low-speed communication line 12.

It should be noted that the front-right node 13, the column node 14, the meter node 15 and the engine node 16 connected to both the high-speed communication line 11 and the low-speed communication line 12 perform transmission of control information between the high-speed communication line 11 and transmission of control information between the low-speed communication line 12.

Among the plurality of nodes, in the center-console node 25, the audio-system node 26, the front-left door node 27, the rear-left door node 28, the front-right door node 29, the rear-right door node 30 and the tail node 31, upon generating a control signal based on received control information inputted from the low-speed communication line 12, an actuator does not require operation process by an operation control unit comprising, e.g., a microcomputer.

Accordingly, the center-console node 25, the audio-system node 26, the front left door node 27, the rear door node 28, the front-right door node 29, the rear-right door node 30 and the tail node 31 correspond to a node 43 as shown in FIG. 2. Node 43, which is a low-speed non-operation control type node, includes a transceiver 41 and an input-output processor 42 connected to the transceiver 41 and does not include an operation control unit. The input-output processor 42 is connected to an actuator 44 and a switch 45 which forms a signal generating device.

In contrast, in the front-right node 13, the column node 14, the meter node 15, the engine node 16, the main-fuse node 17, the ABS node 18, the cowl right-side node 19, the rear-left node 20, the rear-right node 21, the front-left node 22, the instrument panel node 23 and the cowl left-side node 24, upon generating a control signal based on received control information inputted from the high-speed communication line 11 or the low-speed communication line 12, an actuator requires operation process by an operation control unit comprising, e.g., a microcomputer. Further, upon forming transmission control information based on a signal from a signal generating device, the signal generating device requires operation process.

The front-left node 22, the instrument panel node 23 and the cowl left-side node 24 connected to the low-speed communication line 12 among the front-right node 13, the column node 14, the meter node 15, the engine node 16, the main fuse node 17, the ABS node 18, the cowl right-side node 19, the rear-left node 20, the rear node 21, the front-left node 22, the instrument panel node 23 and the cowl left-side node 24 correspond to a node 48 as shown in FIG. 3. Node 48 which is a low-speed operation control type includes a control unit 46, which is connected to the low-speed communication line 12, comprising a microcomputer having a transmission/reception function and operation processing function and an input-output processor 47 connected to the control unit 46. The input-output processor 47 is connected to an actuator 49 and a sensor 50 which forms a signal generating device.

Figure 4:
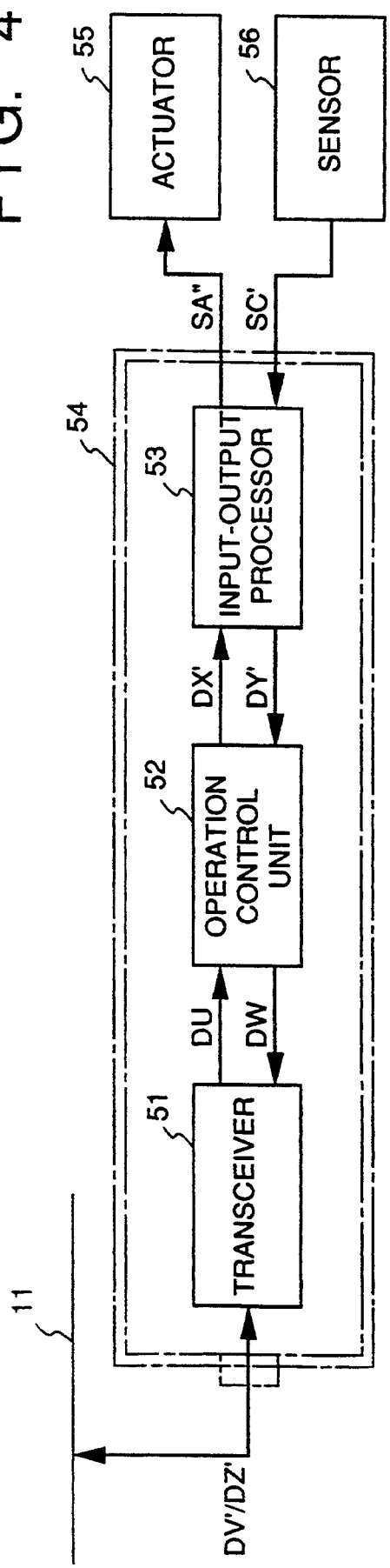
FIG. 4 is a block diagram showing a configuration of a of high-speed operation control type node according to the preferred embodiment.

The main-fuse node 17, the ABS node 18, the cowl right-side node 19, the rear-left node 20 and the rear-right node 21 connected to the high-speed communication line 11 among the front-right node 13, the column node 14, the meter node 15, the engine node 16, the main-fuse node 17, the ABS node 18, the cowl right-side node 19, the rear-left node 20, the rear-right node 21, the front-left node 22, the instrument panel node 23 and the cowl left-side node 24 correspond to a node 54 as shown in FIG. 4. The node 54 which is a high-speed operation control type includes a transceiver 51 connected to the high-speed communication line 11, an operation control unit 52 which comprises a microcomputer and which is connected to the transceiver 51, and an input-output processor 53 connected to the operation control unit 52. The input-output processor 53 is connected to an actuator 55 and a sensor 56, e.g., an ignition key sensor, which forms a signal generating device.

The front-right node 13, the column node 14, the meter node 15 and the engine node 16 connected to both the high-speed communication line 11 and the low-speed communication line 12 among the front-right node 13, the column node 14, the meter node 15, the engine node 16, the main-fuse node 17, the ABS node 18, the cowl right-side node 19, the rear-left node 20, the rear-right node 21, the front-left node 22, the instrument panel node 23 and the cowl left-side node 24 correspond to both the low-speed operation control type node 48 as shown in FIG. 3 and the high-speed operation control type node 54 as shown in FIG. 4.

Figure 5:
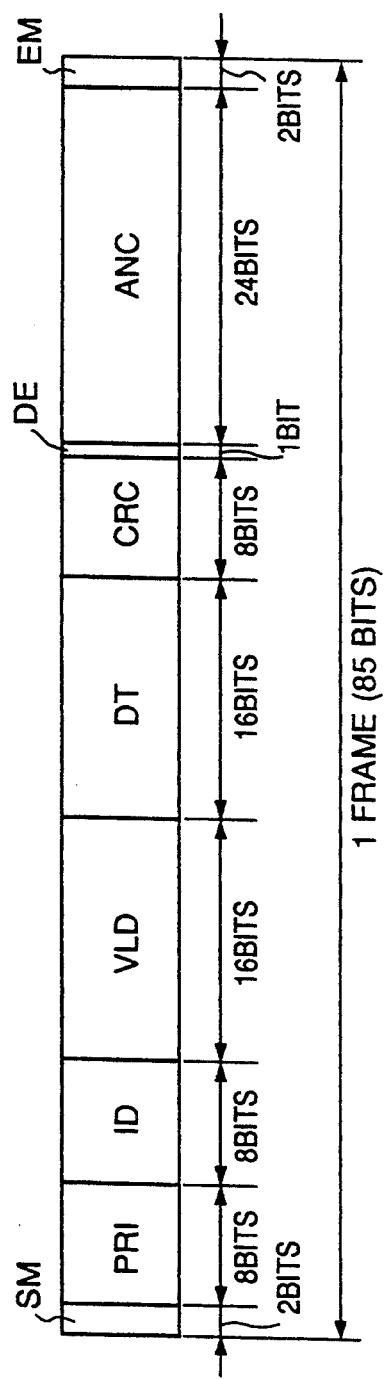
FIG. 5 is a diagram showing the frame structure of control information according to the preferred embodiment.

The control information in the multiplex transmission is transmitted through the high-speed communication line 11 and the low-speed communication line 12 in frame units. FIG. 5 illustrates the structure of the frame unit of the control information. In FIG. 5, the frame is an eighty-five bit code data which includes two-bit start marker SM, eight-bit data PRI indicating priorities, eight-bit data ID indicating information type, sixteen-bit data VLD indicating validity of the information, sixteen-bit data DT indicating the content of the information, eight-bit error correction data CRC, one-bit data end flag DE, twenty-four bit address designation data ANC and two-bit end marker EM.

At the low-speed non-operation control type node 43 as shown in FIG. 2, to which the center-console node 25, the audio-system node 26, the front-left door node 27, the rear-left door node 28, the front-right door node 29, the rear-right door node 30 and the tail node 31 respectively correspond, the transceiver 41 receives reception control information DQ having the frame structure as shown in FIG. 5 from the low-speed communication line 12, then produces reproduced information DP by process such as demodulation and decoding to the reception control information DQ, and supplies the reproduced information DP to the input-output processor 42. The input-output processor 42 performs digital-analog (D/A) conversion of the reproduced information DP to generate a control signal SA and outputs the control signal SA via an amplifier (not shown) to the actuator 44. Thus the actuator 44 is controlled by the control signal SA.

At the low-speed non-operation control type node 43, the switch 45 is manipulated to supply a signal SB to the input-output processor 42. After amplification, the input-output processor 42 performs analog-digital (A/D) conversion to the signal SB to generate transmission information DR and supplies the transmission information DR to the transceiver 41. The transceiver 41 obtains transmission control information DS having the frame structure as shown in FIG. 5 by process such as coding and modulation and sends the transmission control information DS to the low-speed communication line 12.

On the other hand, in the low-speed operation control type node 48, to which the front-left node 22, the instrument panel node 23, the cowl left-side node 24, the front-right node 13, the column node 14, the meter node 15 and the engine node 16 correspond, the control unit 46 receives reception control information DV having the frame structure as shown in FIG. 5 from the low-speed communication line 12. The control unit 46 performs reproduction process to the reception control information DV such as demodulation and decoding and various operation processes to obtain operation process information DX.

The control unit 46 supplies the operation process information DX to the input-output processor 47, which performs D/A conversion to the operation process information DX to generate a control signal SA' and supplies the control signal SA' via an amplifier (not shown) to the actuator 49. Thus the actuator 49 is controlled by the control signal SA'.

Further, in the low-speed operation control type node 48, a detected output signal SC from the sensor 50 is supplied to the input-output processor 47, which, after amplification, performs A/D conversion to the detected output signal SC to generate detected output information DY and supplies the detected output information DY to the control unit 46. The control unit 46 performs operation process based on the detected output information DY and other information, coding and modulation to the detected output information DY to obtain transmission control information DZ having the frame structure as shown in FIG. 5 and sends the transmission control information DZ to the low-speed communication line 12.

At the high-speed operation control type node 54 as shown in FIG. 4, to which the main-fuse node 17, the ABS node 18, the cowl right-side node 19, the rear-left node 20, the rear-right node 21, the front-right node 13, the column node 14, the meter node 15 and the engine node 16 correspond, the transceiver 51 receives reception control information DV' having the frame structure as shown in FIG. 5 from the high-speed communication line 11. The transceiver 51 obtains reproduced information DU by process such as demodulation and decoding to the reception control information DV' and supplies the reproduced information DU to the operation control unit 52.

The operation control unit 52 obtains operation process information DX' by operation process based on the reproduced information DU and other information and supplies the operation process information DX' to the input-output processor 53. The input-output processor 53 performs D/A conversion to the operation process information DX' to generate a control signal SA" and supplies the control signal SA" via an amplifier (not shown) to the actuator 55. Thus the actuator 55 is operated by the control signal SA".

At the high-speed operation process type node 54, a detected output signal SC' from the sensor 55 is supplied to the input-output processor 53, which, after amplification, performs A/D conversion to the detected output signal SC' to generate detected output information DY' and supplies the detected output information DY' to the operation control unit 52. The operation control unit 52 obtains operation process output information DW by operation process based on the detected output information DY' and other information and supplies the operation process output information DW to the transceiver 51. The transceiver 51 performs process such as coding and demodulation to the operation process output information DW to obtain transmission control information DZ' having the frame structure as shown in FIG. 5 and supplies the transmission control information DZ' to the high-speed communication line 11.

Next, a modification to the preferred embodiment will be described below. It should be noted that the configuration of an apparatus in the modification is similar to that in the preferred embodiment except an additional node 60 and a connecting end portion 61 are provided, the explanation will be made with reference to FIG. 1.

In FIG. 1, the apparatus further comprises the additional node 60 which is connected to the low-speed communication line 12 and the connecting end portion 61 for connecting the additional node 60. The additional node 60 is connected to another additional control system as an actuator, and the node 60 corresponds to the low-speed non-operation control type node 43. When the additional node 60 is connected to the connecting end portion 61 and the additional control system is connected to the additional node 60, the incorporated control unit 46 in the cowl left-side node 24 which corresponds to the low-speed operation control type node 48 has function for processing operation required by the additional control system. In this manner, the additional control system can be appropriately controlled through the cowl left-side node 24 and the additional node 60.

In this case, the center-console node 25, the audio system node 26, the front-left door node 27, the rear-left door node 28, the front-right door node 29, the rear-right door node 30 and the tail node 31 correspond to the low-speed non-operation control type node 43 as shown in FIG. 2, while the front-right node 13, the column node 14, the meter node 15, the engine node 16, the main-fuse node 17, the ABS node 18, the cowl right-side node 19, the rear-left node 20, the rear-right node 21, the front-left node 22, the instrument panel node 23 and the cowl left-side node 24 correspond to the low-speed operation control type node 48 as shown in FIG. 3 or the high-speed operation control type node 54 including the operation control unit 52 as shown in FIG. 4. Accordingly, wasteful part of the arrangement of the plurality of nodes can be deleted and efficiency of cost can be improved.

As many apparently widely different embodiments of the present invention can be made without departing from the spirit and scope thereof, it is to be understood that the invention is not limited to the specific embodiments thereof except as defined in the appended claims.

What is claimed is:

1. A multiplex transmission apparatus including a plurality of control nodes connected to a common multiplex transmission path in a decentralized manner, said plurality of control nodes classified into a plurality of types of nodes corresponding to control functions, comprising:
   communication control means, located in each of said plurality of control nodes, for performing a communication function dependent upon the type of node; and
   operation process means, located in a specific control node among said plurality of control nodes, for performing a predetermined operation process,
   wherein the communication control means in the specific control node controls signal communication between the multiplex transmission path and the operation process means, and said operation process means performs an operation generating a first control signal based on control information received from the multiplex transmission path, while nodes other than the specific control node generate a second control signal based on control information received from the multiplex transmission path without performing operation process.

2. The apparatus according to claim 1, further comprising:
   a first actuator connected to the specific control node, said first actuator being controlled by the first control signal; and
   a second actuator connected to the nodes other than the specific control node, said second actuator being controlled by the second control signal.

3. The apparatus according to claim 1, further comprising:
   a first signal generating device connected to the specific control node, and generating a first signal supplied to the specific control node, wherein said operation process means in the specific control node performs operation process for generating a first transmission control signal based on the first signal generating from said first signal generating device; and
   a second signal generating device connected to the nodes other than the specific control node, and generating a second transmission control signal, without performing operation process, based on a second signal generated from said second signal generating device.

4. The apparatus according to claim 1, wherein the multiplex transmission path comprises a low-speed transmission path and a high-speed transmission path, and the plurality of control nodes are classified into nodes connected to the low-speed transmission path, nodes connected to the high-speed transmission path and nodes connected to both the low-speed transmission path and the high-speed transmission path.

5. The apparatus according to claim 4, wherein the nodes connected to both the low-speed transmission path and the high-speed transmission path perform operation process for generating a control signal based on control information received from the multiplex transmission paths.

6. The apparatus according to claims 4, wherein the nodes connected to the low-speed transmission path comprise:
   a single controller to transmit control information to and receive control information from the low-speed transmission path, and to perform a predetermined operation process; and
   an input-output portion to input and output a predetermined control signal.

7. The apparatus according to claim 4, wherein the nodes connected to the high-speed transmission path comprise:
   a transceiver to transmit control information to and receive control information from the high-speed transmission path;
   an input-output portion to input and output a control signal; and
   an operation controller located between said transceiver and said input-output portion to perform a predetermined operation process.

8. The apparatus according to claim 1, wherein the multiplex transmission path further comprises a connecting portion to connect one of the plurality of nodes other than the specific control node to the multiplex transmission path, and wherein when the node other than the specific control node is connected to the connecting portion, said operation process means generates the second control signal in the node.

9. A multiplex transmission apparatus including a plurality of control nodes connected to a common multiplex transmission path in a decentralized manner, the plurality of control nodes classified into a plurality of types of nodes corresponding to control functions, the apparatus comprising:

a transceiver located in each of said plurality of control nodes to perform a communication function dependent upon a type of node; and an operation control unit located in a specific control node among the plurality of control nodes to perform a predetermined operation process, wherein the transceiver in the specific control node controls signal communication between the multiplex transmission path and the operation control unit, and the operation control unit performs an operation generating a first control signal based on control information received from the multiplex transmission path, while nodes other than the specific control node generate a second control signal, without performing operation process, based on control information received from the multiplex transmission path.

10. A multiplex transmission apparatus, comprising:

a common multiplex transmission path;

a first control node connected to said common multiplex transmission path, said first control node including an operation control unit to receive control information from the common multiplex transmission path and perform a predetermined operation process to generate a first control signal based on the received control information, and a first communication unit to control signal communication between the multiplex transmission path and the operation control unit; and a second control node connected to said common multiplex transmission path, said second control node including a second communication unit to generate a second control signal, without performing operation process, based on control information received from the multiplex transmission path.

* * * * *